(12) United States Patent
Dill et al.

(10) Patent No.: US 10,012,674 B2
(45) Date of Patent: Jul. 3, 2018

(54) NANOANTENNA SCANNING PROBE TIP, AND FABRICATION METHODS

(71) Applicant: The Regents of the University of California, Oakland, CA (US)

(72) Inventors: Tyler Jamison Dill, San Diego, CA (US); Andrea Rae Tao, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 15/257,150

(22) Filed: Sep. 6, 2016

(65) Prior Publication Data

US 2017/0115323 A1    Apr. 27, 2017

Related U.S. Application Data

(60) Provisional application No. 62/214,547, filed on Sep. 4, 2015.

(51) Int. Cl.
| | |
|---|---|
| *G01Q 30/02* | (2010.01) |
| *G01Q 60/16* | (2010.01) |
| *G01Q 60/38* | (2010.01) |

(52) U.S. Cl.
CPC .......... *G01Q 30/025* (2013.01); *G01Q 60/16* (2013.01); *G01Q 60/38* (2013.01)

(58) Field of Classification Search
CPC ...... B82Y 35/00; G01Q 30/00; G01Q 30/025; G01Q 60/00; G01Q 60/16; G01Q 60/38
See application file for complete search history.

(56) References Cited

U.S. PATENT DOCUMENTS

| | | | | | |
|---|---|---|---|---|---|
| 5,861,624 | A | * | 1/1999 | Alexander | B82Y 35/00 850/26 |
| 6,156,216 | A | * | 12/2000 | Manalis | B82Y 35/00 216/11 |
| 7,282,710 | B1 | * | 10/2007 | Black | G01Q 70/14 250/306 |

(Continued)

OTHER PUBLICATIONS

Gonzalez et al, "Improving the Lateral Resolution of Quartz Tuning Fork-Based Sensors in Liquid by Integrating the Commercial AFM Tips into the Fiber End", Sensors 2015, 15, 1601-1610.*

(Continued)

*Primary Examiner* — David E Smith
(74) *Attorney, Agent, or Firm* — Greer, Burns & Crain, Ltd.; Steven P. Fallon

(57) ABSTRACT

The invention provides a nanoantenna scanning probe tip for microscropy or spectroscopy. The nanoantenna scanning probe tip includes a sharp probe tip covered with a contiguous film of predetermined sized and shaped plasmonic nanoparticles. A method for forming the nanoantenna scanning probe tip by trapping nanoparticles having a predetermined size and shape at a liquid surface using surface tension, forming a uniform and organized monolayer film on the liquid surface, and then transferring portions of the film to a sharp probe tip. In preferred embodiments, the sharp probe tip is one of a conductive STM (scanning tunneling microscopy) tip, a tuning fork tip or an AFM (atomic force microscopy) tip. The sharp tip can be blunted with an oxide layer.

29 Claims, 11 Drawing Sheets

(56) References Cited

U.S. PATENT DOCUMENTS

| | | | | |
|---|---|---|---|---|
| 2006/0251874 | A1* | 11/2006 | McClure | B01D 67/0027 428/210 |
| 2007/0035724 | A1* | 2/2007 | Banin | G01N 21/6428 356/236 |
| 2009/0169807 | A1* | 7/2009 | Yang | G01N 21/658 428/119 |
| 2009/0263912 | A1* | 10/2009 | Yang | G01N 21/05 436/164 |
| 2012/0184451 | A1* | 7/2012 | Singamaneni | B82Y 5/00 506/9 |

OTHER PUBLICATIONS

Xie and Schlucker, "Rationally Designed Multifunctional Plasmonic Nanostructures for Surface-Enhanced Raman Spectroscopy: A Review", Rep. Prog. Phys. 77 (2014.*

Wei Bao et al., "Mapping Local Charge Recombination Heterogeneity by Multidimensional Nanospectroscopic Imaging", Science Magazine, vol. 338, pp. 1317-1321, Dec. 7, 2012.

Samuel Berweger and Markus B. Raschke, "Signal limitations in tip-enhanced Raman scattering: the challenge to become a routine analytical technique", Anal Bioanal Chem, vol. 396, pp. 115-123, 2010.

Chi Chen et al., "A 1.7 nm resolution chemical analysis of carbon nanotubes by tip-enhanced Raman imaging in the ambient", Nature Communications, vol. 5, No. 3312, pp. 1-5, Feb. 12, 2014.

Francesco De Angelis et al., "Nanoscale chemical mapping using three-dimensional adiabatic compression of surface plasmon polaritons", Nature Nanotechnology, vol. 5, pp. 67-72, Nov. 22, 2009.

Timothy W. Johnson et al., "Highly Reproducible Near-Field Optical Imaging with Sub-20-nm Resolution Based on Template-Stripped Gold Pyramids", ACS Nano, vol. 6, No. 10, pp. 9168-9174, Aug. 31, 2012.

S.S. Kharintsev et al., "Plasmonic optical antenna design for performing tip-enhanced Raman spectroscopy and microscopy", Journal of Physics D: Applied Physics, vol. 46, 145501, Mar. 14, 2013.

Noah Kolodziejski, "Tip-Enhanced Raman Spectroscopy for the Base Interrogation of DNA", Methods in Cell Biology, vol. 114, pp. 611-628, 2013.

Naresh Kumar et al., "Tip-enhanced Raman spectroscopy: principles and applications", EPJ Techniques and Instrumentation, vol. 2, No. 9, 2015.

Mingzhao Liu and Philippe Guyot-Sionnest, "Mechanism of Silver(I)—Assisted Growth of Gold Nanorods and Bipyramids", J. Phys. Chem B, vol. 109, pp. 22192-22200, Sep. 16, 2005.

C.C. Neacsu et al., "Plasmonic light scattering from nanoscopic metal tips", Applied Physics B: Lasers and Optics, vol. 80, pp. 295-300, Feb. 9, 2005.

Catalin C. Neacsu et al., "Scanning-probe Raman spectroscopy with single-molecule sensitivity", Journal of Physical Review B, vol. 73, 193406, 2006.

Ioan Notingher and Alistair Elfick, "Effect of Sample and Substrate Electric Properties on the Electric Field Enhancement at the Apex of SPM Nanotips", J. Phys. Chem B, vol. 109, pp. 15699-15706, Jun. 27, 2005.

Bruno Pettinger et al., "Tip-enhanced Raman scattering: Influence of the tip-surface geometry on optical resonance and enhancement", Journal of Surface Science, vol. 603, pp. 1335-1341, Jan. 13, 2009.

Bruno Pettinger et al., "Tip-Enhanced Raman Spectroscopy: Near-Fields Acting on a Few Molecules", The Annual Review of Physical Chemistry, vol. 63, pp. 379-399, Jan. 20, 2012.

Xiaohu Qian and Harold S. Park, "Strain effects on the SERS enhancements for spherical silver nanoparticles", Journal of Nanotechnology, vol. 21, 365704, Aug. 11, 2010.

Qianqian Shi et al., "Two-Dimensional Bipyramid Plasmonic Nanoparticle Liquid Crystalline Superstructure with Four Distinct Orientational Packing Orders", ACS Nano, vol. 10, pp. 967-976, Jan. 5, 2016.

Johannes Stadler et al., "Tip-enhanced Raman spectroscopic imaging of patterned thiol monolayers", Beilstein Journal of Nanotechnology, vol. 2, pp. 509-515, Aug. 30, 2011.

Atsushi Taguchi et al., "Optical antennas with multiple plasmonic nanoparticles for tip-enhanced Raman microscopy", Nanoscale, vol. 7, 17424, 2015.

Regina Treffer et al., "Distinction of nucleobases- a tip-enhanced Raman approach", Beilstein Journal of Nanotechnology, vol. 2, pp. 628-637, Sep. 23, 2011.

Zhilin Yang et al., "Electromagnetic field enhancement in TERS configurations", Journal of Raman Spectroscopy, vol. 40, pp. 1343-1348, Sep. 1, 2009.

* cited by examiner

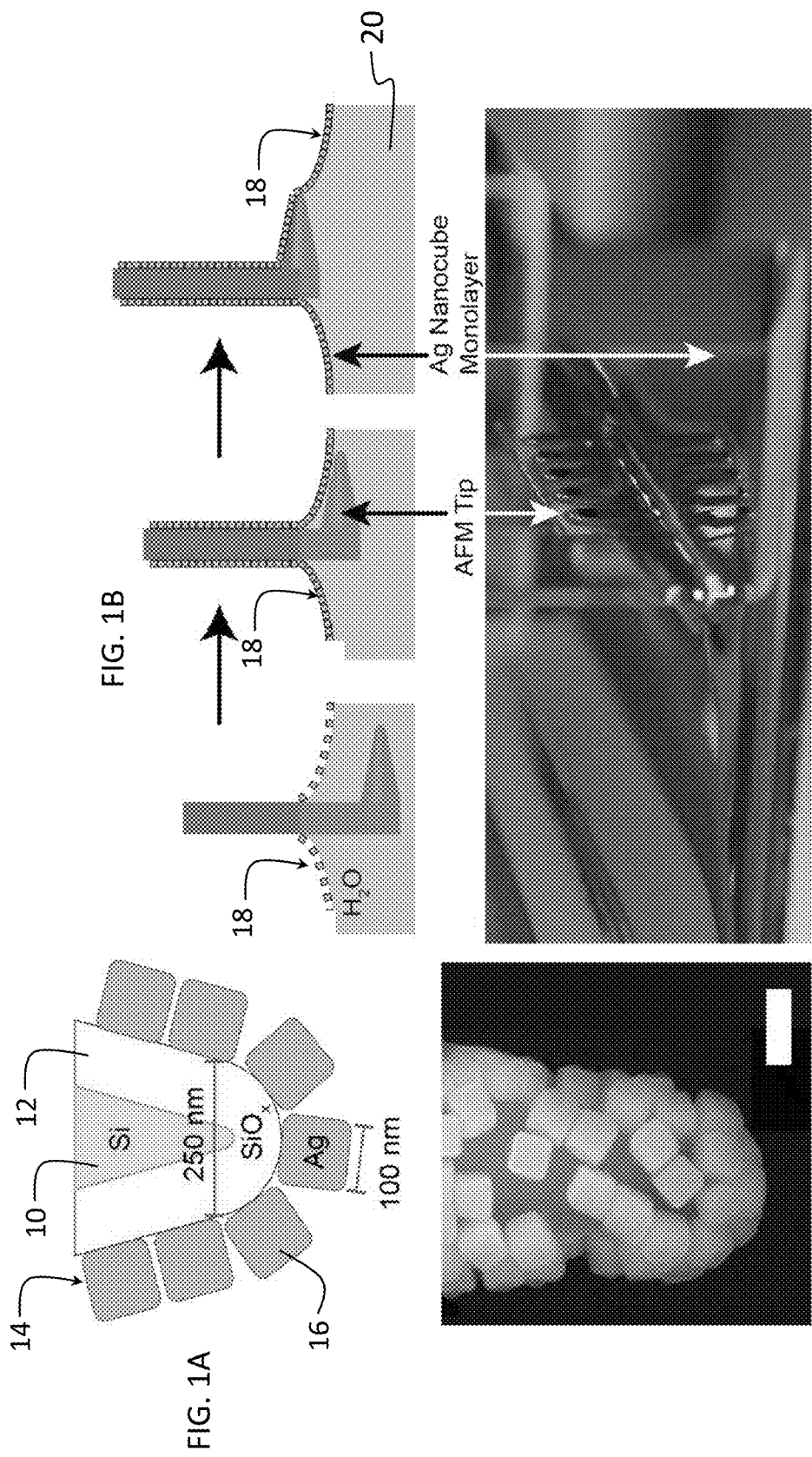

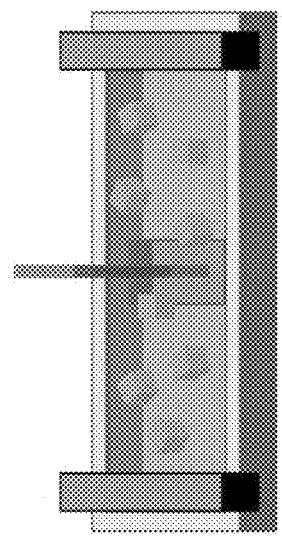
FIG. 1I
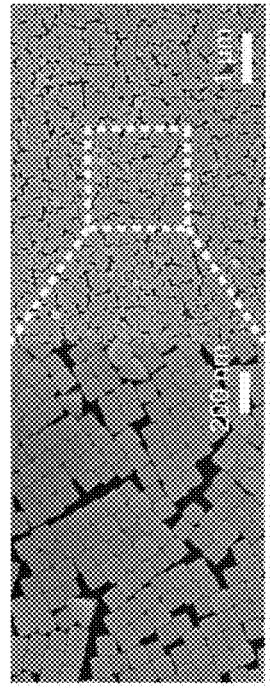
FIG. 1J
FIG. 1K
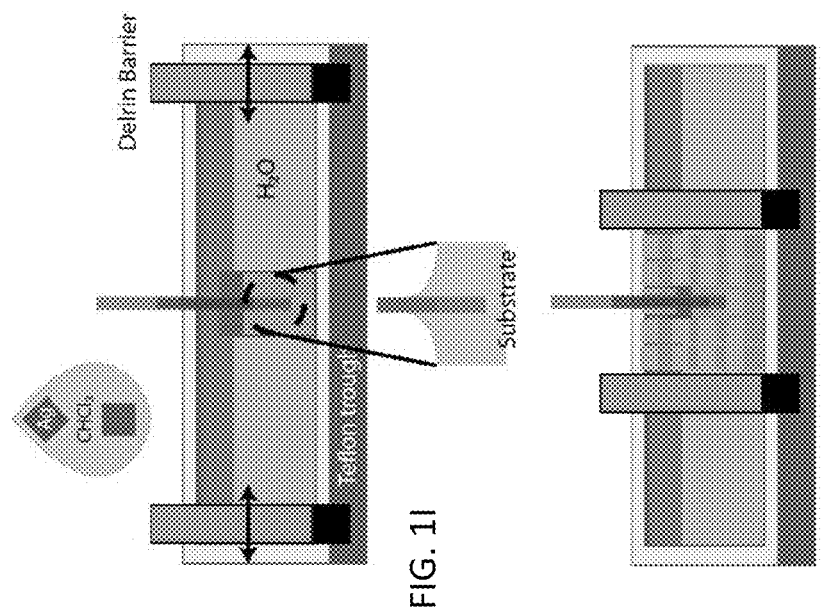
FIG. 1L

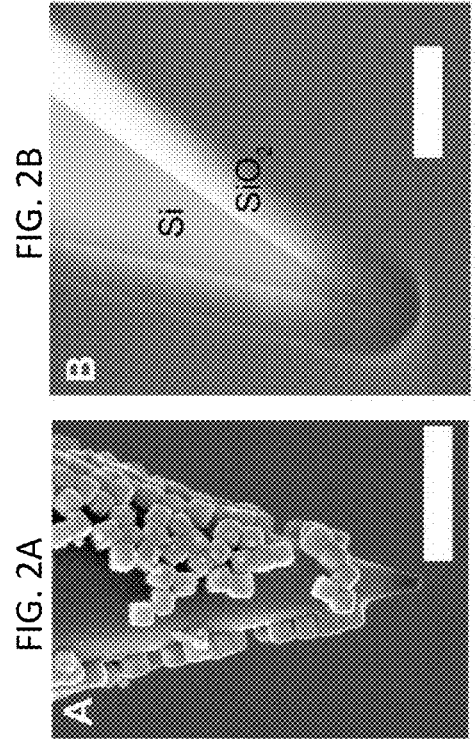
FIG. 2A
FIG. 2B
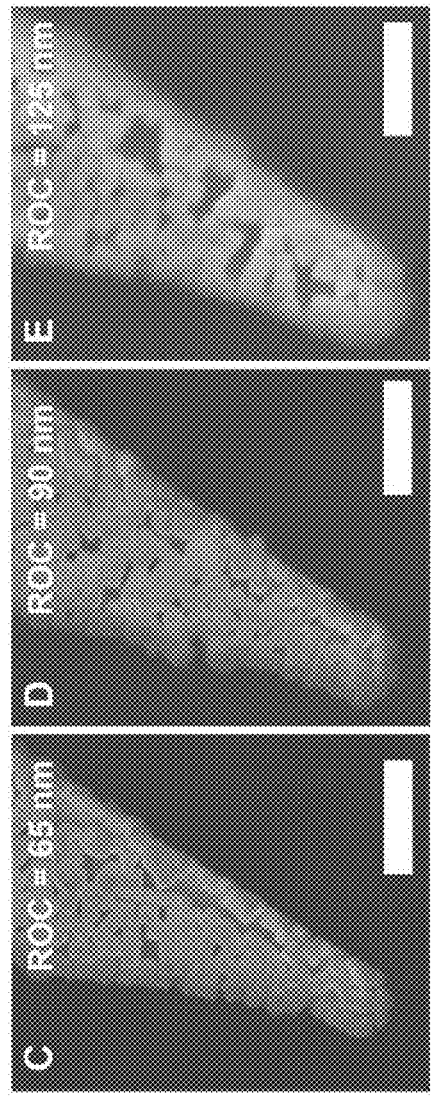
FIG. 2C
FIG. 2D
FIG. 2E

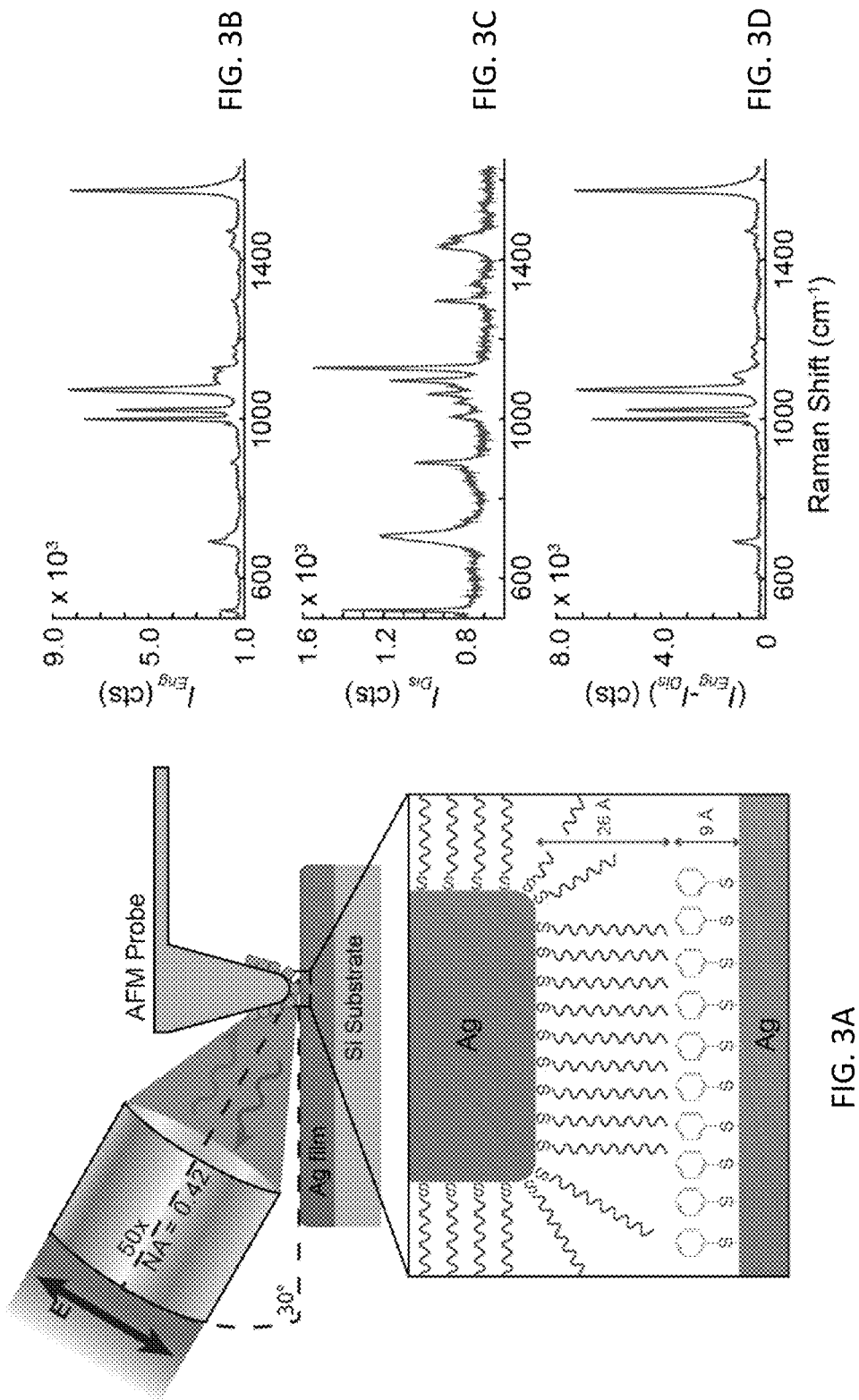

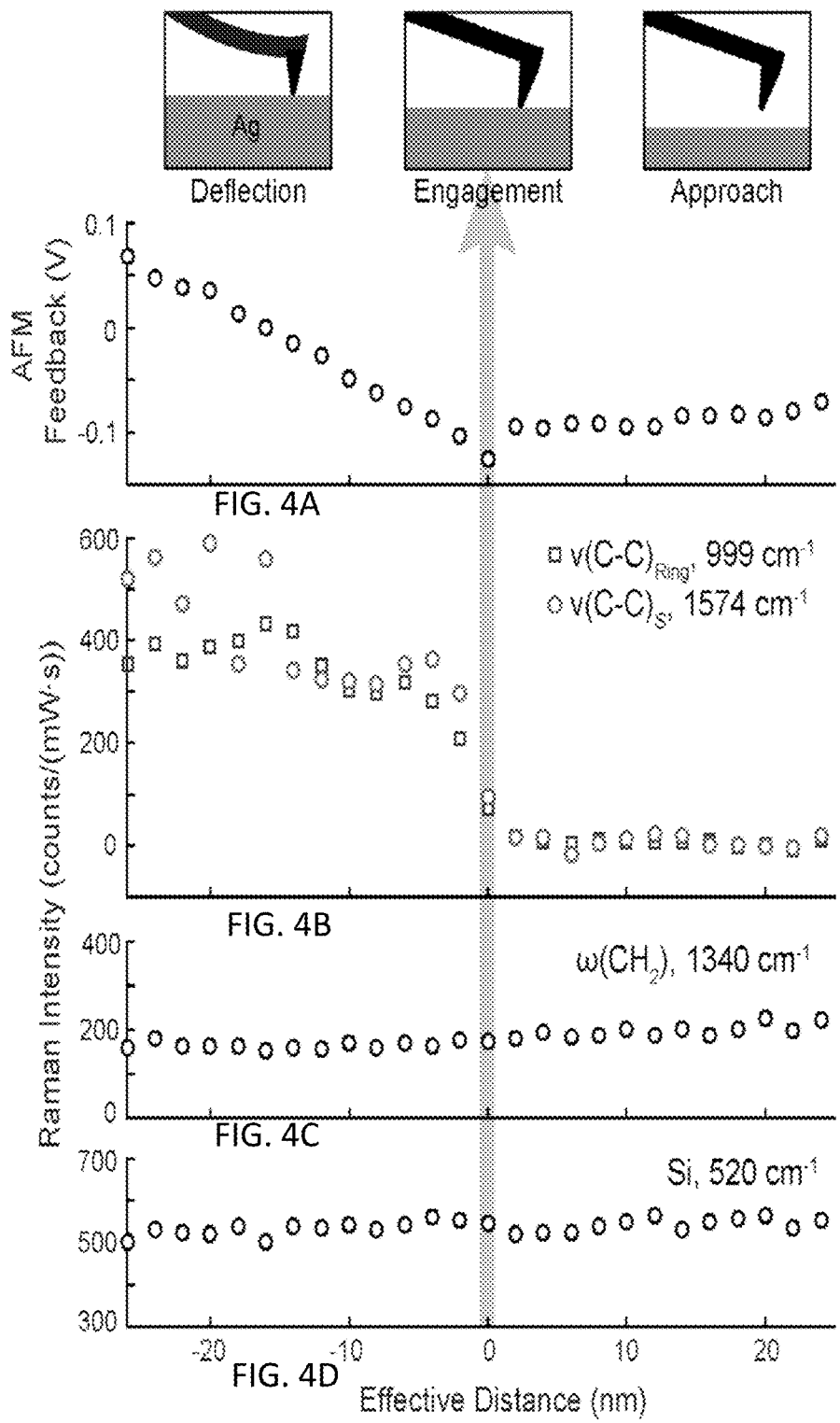

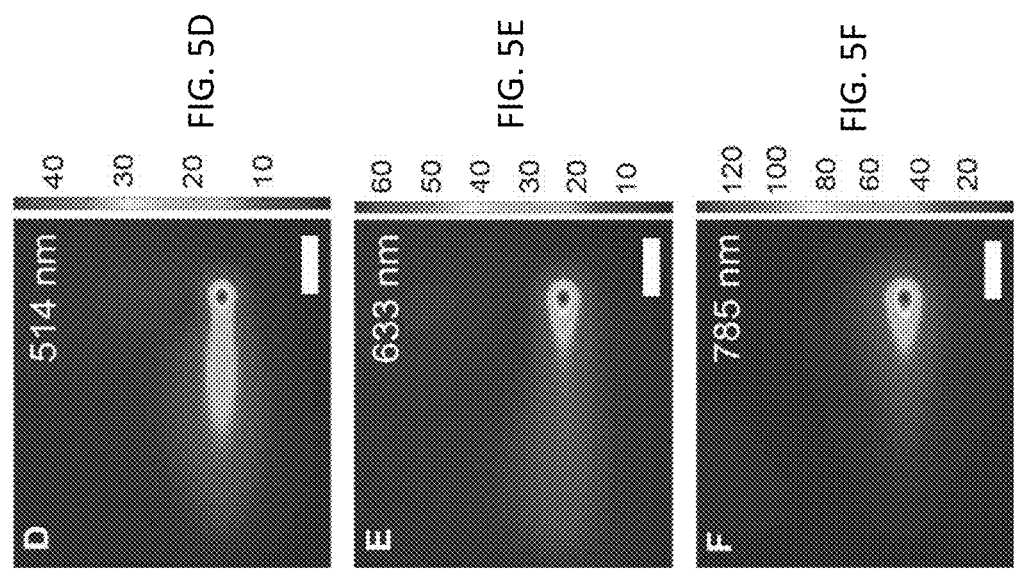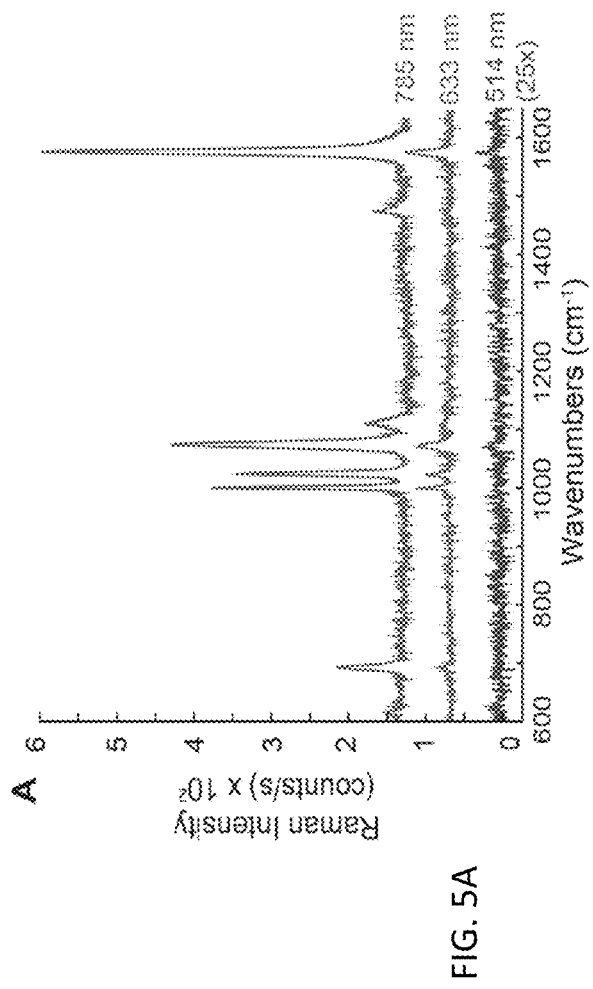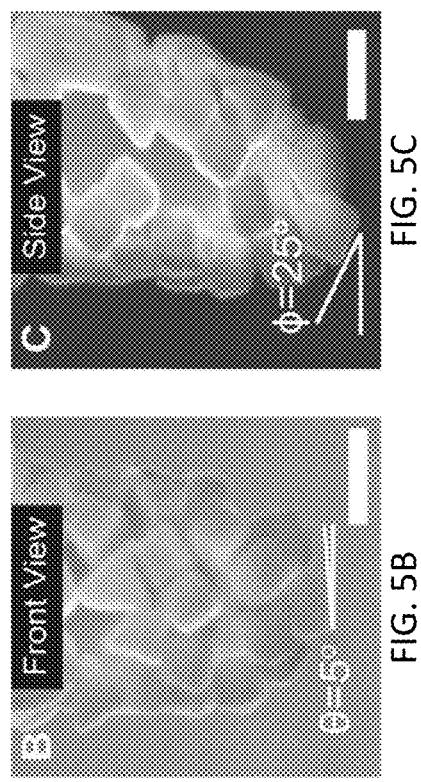
FIG. 5A
FIG. 5B
FIG. 5C
FIG. 5D
FIG. 5E
FIG. 5F

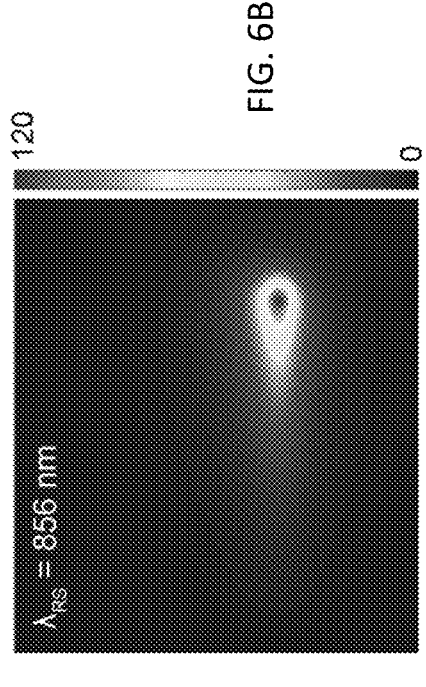
FIG. 6A
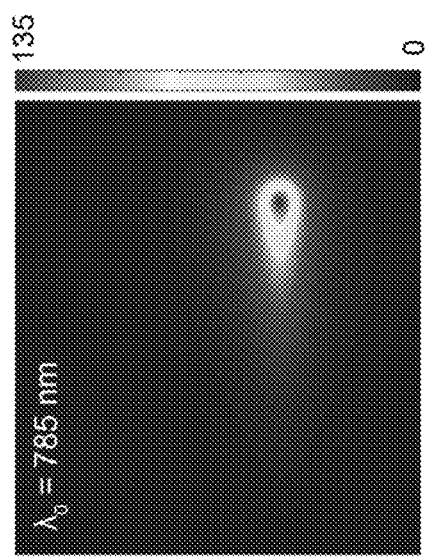
FIG. 6C
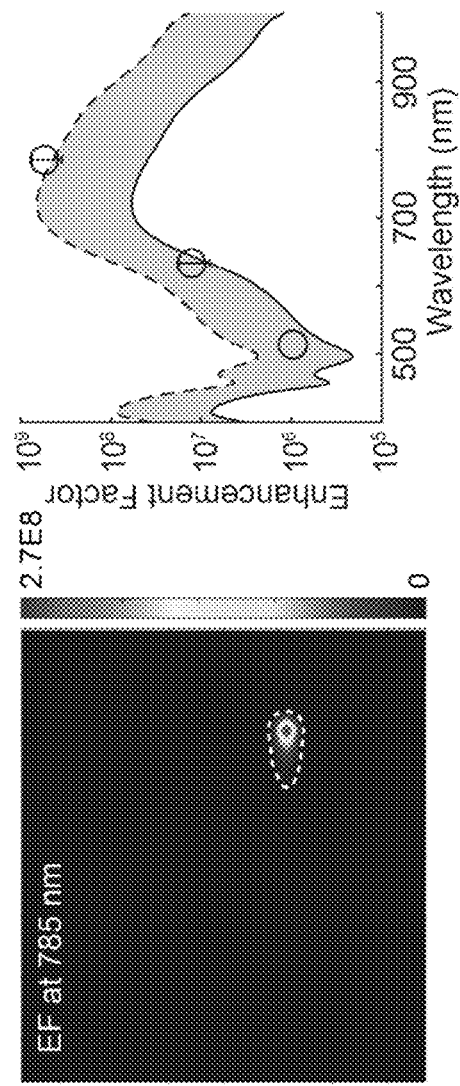
FIG. 6B
FIG. 6D

NANOANTENNA SCANNING PROBE TIP, AND FABRICATION METHODS

PRIORITY CLAIM AND REFERENCE TO RELATED APPLICATION

The application claims priority under 35 U.S.C. § 119 from prior provisional application Ser. No. 62/214,547, which was filed Sep. 4, 2015.

STATEMENT OF GOVERNMENT INTEREST

This invention was made with government support under award number D14AP00046 awarded by the Defense Advanced Research Projects Agency, award number ECCS 1125789 awarded by the National Science Foundation and under award numbers N00014-12-1-0574 and N00014-13-1-0655 awarded by the Office of Naval Research. The government has certain rights in the invention.

FIELD

Fields of the invention include tip-enhanced spectroscopy and atomic force microscopy, tip-enhanced Raman spectroscopy, scanning tunneling microscopy, and scanning near-field optical microscopy. Additional fields include tip-enhanced fluorescence and tip-enhanced photoluminescence. The invention is generally applicable to devices and techniques that make use of a scanning probe.

BACKGROUND

Scanning probe microscopy techniques provide imaging, force measurement, and molecular manipulations. Scanning probe microscopy techniques provide higher resolution than the optical diffraction limit through use of a sharp scanning probe that contacts a surface. Types of scanning probe microscopy include atomic force microscopy (AFM), scanning tunneling microscopy (STM), and scanning near-field optical microscopy (SNOM), and tuning fork scanning probe microscopy.

Tip-enhanced Raman spectroscopy (TERS) combines Raman spectroscopy that leverages an atomic force microscope. TERS can also be performed with an STM or in tuning fork feedback operational mode. TERS is a powerful optical technique for resolving features of a surface. It is of particular interest for chemical mapping, and provides the potential to achieve quantitative spectroscopic analysis of arbitrary surfaces with nanoscale resolution. TERS combines ultrasensitive vibrational spectroscopy with scanning probe methods by using a nanoscale probe tip to probe a surface. Unfortunately, typical manufacturing techniques for batch manufacturing of TERS probes yield high variability from probe tip to probe tip.

TERS at present is primarily a research technique because batch manufacturing of precise tips has not been provided. Research groups with extensive plasmonic and fabrication knowledge can fabricate individual tips effectively enough to perform TERS experiments. The commercial tips currently on market are expensive and unreliable. This prevents companies and research groups from investing in TERS equipment. If the tips could be be fabricated and sold with a low cost and high reliability, the technique could become more prevalent and routine, growing the market both for TERS equipment and TERS tips. There are several markets interested in TERS seeing commercial reality, the largest of which is the semiconductor industry. TERS can give information about dopants, stress/strain, material composition, crystal orientation, and other properties of semiconductor and solid state devices that are unobservable with other current techniques. There are many interesting biological questions that can potentially be addressed with TERS as well. There are also biological sensors and characterization applications for TERS, for example, it has been demonstrated that TERS could be used to sequence DNA. See, e.g., Kolodziejski, N., "Tip-enhanced Raman spectroscopy for the base interrogation of DNA," Methods Cell Biol., 114: 611-28 (2013). It may also be useful for looking at cell membrane composition, and in many other biological applications. See, e.g., Kumar et al., "Tip-enhanced Raman spectroscopy: principles and applications," EPJ Techniques and Instrumentation 20152:9 (Jul. 1, 2015).

The primary methods of fabricating AFM probe tips for TERS include electrochemical etching of metal wires, evaporation of metal onto probe tips, and top down fabrication. See, e.g., Kharintsev, S. S.; Hoffmann, G. G.; Fishman, A. I.; Salakhov, M. K. Plasmonic Optical Antenna Design for Performing Tip-Enhanced Raman Spectroscopy and Microscopy. J. Phys. D: Appl. Phys. 2013, 46, 145501; Taguchi, A.; Yu, J.; Verma, P.; Kawata, S. Optical Antennas with Multiple Plasmonic Nanoparticles for Tip-Enhanced Raman Microscopy. Nanoscale 2015, 7, 17424-17433; De Angelis, F.; Das, G.; Candeloro, P.; Patrini, M.; Galli, M.; Bek, A.; Lazzarino, M.; Maksymov, I.; Liberale, C.; Andreani, L. C.; Di Fabrizio, E. Nanoscale Chemical Mapping Using Three-Dimensional Adiabatic Compression of Surface Plasmon Polaritons. Nat. Nanotechnol. 2010, 5, 67-72. Electrochemical etching of metal wires involves a gold or silver wire that is inserted through a gold/platinum circular electrode and submerged in an acidic solution. The wire is etched when a bias is applied. When thin enough, the bottom part of the wire breaks away, leaving a sharp tip at the end which functions as a TERS tip. Evaporation of metal onto AFM probes coats commercial AFM probes with an evaporated film of metal 40-70 nm thick. The film at the apex of the tip acts as a nanoparticle. This is one of few processes that can be used as a batch fabrication technique.

There are a few examples where groups have been able to get the film to anneal into islands, creating separate nanoparticles that improve on TERS quality, they still suffer from the same problems of unpredictability, unreliability however. Top down fabrication includes a variety of engineered TERS tips that use extremely low throughput and expensive machines (focused-ion beam and electron beam) to fabricate highly precise tips. These tips are high performance but can take dozens of hours for highly trained individuals to fabricate.

Johnson et al., report fabrication of (10 nm) metallic probes suitable for scanning probe microscopy and spectroscopy techniques. See, Johnson et al., "Highly Reproducible Near-Field Optical Imaging with Sub-20-nm Resolution Based on Template-Stripped Gold Pyramids," ACS Nano, Vol. 6, No. 10, pp 9168-74 (2012). This fabrication technique deposits gold into a shaped template and strips the formed gold tips out of the template. A silicon nitride mask is used to define regions for anisotropic etching of silicon with KOH. This patterns a high quality silicon wafer with pyramid shaped hollows having an apex angle of 70.52°. Gold is deposited into the hollows. A lift-off frees the gold deposits leaving isolated gold pyramids, which can then be stripped out of the hollows using epoxy and a thin tungsten wire. The pyramids are attached to the tips via the epoxy that strips them from the mold. The tips in this case are not AFM tips, but are instead tuning fork tips. The tips are formed from wires, which are epoxied or otherwise attached to a small quartz crystal that turns the whole tip into a resonator. The tuning fork tips can be in a scanning probe feedback mode that is similar to the use of AFM probes and techniques.

Scanning tunneling microscopy (STM) relies upon quantum tunneling between a surface and an STM tip. The STM tip is a conductive tip is brought close to a surface and a bias between tip and the surface electrons to tunnel through the vacuum between them. STM tips used for TERS are silver or gold, which are the plasmonically active materials.

SUMMARY OF THE INVENTION

An embodiment of the invention is a method for fabricating a nanoantenna scanning probe. The method includes trapping nanoparticles having a predetermined size and shape at a liquid surface using surface tension, forming a uniform and organized monolayer film on the liquid surface, and transferring portions of the film to a sharp probe tip. In preferred embodiments, the sharp probe tip is one of a conductive STM (scanning tunneling microscopy) tip, a tuning fork tip or an AFM (atomic force microscopy) tip. The sharp tip can be blunted with an oxide layer. In preferred embodiments, the nanoparticles are silver nanocubes. In other preferred embodiments, the nanoparticles are gold bipyramidal nanoparticles.

An embodiment is a nanoantenna scanning probe tip for micro scropy or spectroscopy. The nanoantenna scanning probe tip includes a sharp probe tip covered with a contiguous film of predetermined sized and shaped plasmonic nanoparticles. In preferred embodiments, the sharp probe tip is one of a conductive STM (scanning tunneling microscopy) tip, a tuning fork tip or an AFM (atomic force microscopy) tip. The sharp tip can be blunted with an oxide layer. In preferred embodiments, the nanoparticles are silver nanocubes. In other preferred embodiments, the nanoparticles are gold bipyramidal nanoparticles.

An embodiment of the invention is a method for scanning probe spectroscopy. The method includes bringing a nanoantenna scanning probe into contact or near a surface, wherein the nanoantenna scanning probe includes an sharp probe tip coated with a film of plasmonic nanoparticles. The probe is moved relative to the surface. A radiation beam is directed at the probe tip and spectra are obtained during the moving.

BRIEF DESCRIPTION OF THE DRAWINGS

FIGS. 1A-1D illustrate a preferred embodiment method that was conducted experimentally to fabricate nanoantenna scanning probe with plasmonic nanoparticles;

FIGS. 1I-1L illustrate the process used in the experiments to form the compressed nanoparticle films;

FIGS. 2A-2E illustrate preferred fabrication methods using different radius of curvature AFM tips;

FIGS. 3A-3D illustrated a tip enhanced Raman spectroscopy experiment and data obtained in the experiment using nanonantenna scanning probe tips with plasmonic nanoparticles of the invention;

FIGS. 4A-4D are data showing TERS near-field effect as a function of tip-sample distance;

FIG. 5A includes TERS spectra collected at different laser excitation wavelengths for the experimental nanoantenna shown in FIGS. 5B and 5C (514 nm is multiplied 25× to identify the 1574 cm$^{-1}$ I$_{stretch}$ peak), and FIGS. 5D-5F illustrate the simulated field enhancement;

FIGS. 6A and 6B respectively show simulated data of the Field enhancement resulting from the apex AgNC solved at the excitation wavelength of 785 nm and 856 nm, for the 999 cm$^{-1}$ Raman shifted wavelength; FIG. 6C shows calculated EF (enhancement factor); FIG. 6D plots EF determined over the visible spectrum;

DETAILED DESCRIPTION OF THE PREFERRED EMBODIMENTS

Figure 1E:
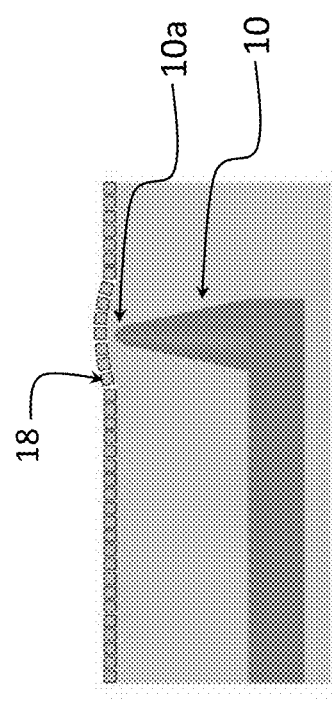
FIG. 1E-1F illustrate a modified preferred embodiment method that was conducted experimentally to fabricate nanoantenna scanning probes with plasmonic nanoparticles.

A preferred embodiment is a nanoantenna scanning probe. The scanning probe includes a sharp probe tip that is covered with contiguous film of predetermined sized and shaped plasmonic crystals. In preferred embodiments, the sharp probe tip is an AFM tip, and in other preferred embodiments the sharp probe tip is a conductive STM tip or a tuning fork tip. In preferred embodiments, the AFM tip is a blunted AFM tip. In preferred embodiments, the AFM tip is covered with a monolayer of the predetermined sized and shaped plasmonic crystals. The plasmonic crystals make the AFM probe into a nanoantenna.

A preferred embodiment is a method for fabricating nanoantenna scanning probes. Nanoparticles having a predetermined size and shape are trapped at a liquid surface using surface tension. The nanoparticles are allowed to form a uniform and organized monolayer film. A portion of the film is transferred to sharp probe tip, such as an AFM tip, conductive STM tip or a tuning fork tip. The sharp probe tip is preferably a blunted tip. Preferred methods include the simultaneous transfer of different portions of the film to a plurality of sharp probe tips. Such preferred methods permit batch fabrication of uniform scanning probe tips. The scanning probes of the invention function as nanoantennas and are suitable, for example as TERS probes. Methods of the invention provide for addition of nanoparticles on the probe tip. The crystals improve the consistency of probe tips, and also improve reliability and signal-to-noise ratios. Significant improvements have been demonstrated in TERS experiments with experimental nanoantenna scanning probe tips of the invention.

In preferred fabrication methods, the Langmuir-Blodgett process is used to assemble colloidally grown metallic nanoparticles onto the surface of an AFM probe. Experiments have demonstrated that this process produces tips that yield extremely strong TERS signals. The method uses shaped metal nanomaterials that act as an antenna that focus light to nanometer length scales, and can be leveraged to locally enhance Raman scattering, which provides chemical information about a sample or material. When this antenna tip is rastered over a surface it can provide high resolution & high sensitivity chemical maps. This allows new levels of insight into nanomaterials and their properties. Preferred embodiments provide a silicon AFM probe with a contiguous layer of plasmonic nanoparticles that act as plasmonic nanoantenna.

Preferred embodiments include a scanning probe tip with a film, which is itself is an advantage over a single nanocyrstal at the AFM probe tip. The nearby nanocubes act as a waveguide that can direct light to the apex with improved efficiency. This contiguous layer also provides mechanical stability.

Preferred methods achieve consistent plasmon probes using size and shape controllable nanoparticles. The particles are single crystalline and nearly-atomically flat. These nanoparticles are advantageous over deposited or etched metal probes which have shapes that are uncontrollable on the nano scale, and are rough, and polycrystalline. A preferred fabrication process is independent of the size or shape of the plasmonic nanoparticles used. The size and shape of nanoparticle used in the probe fabrication can therefore be engineered, which allows precise tuning of the antenna's performance to meet predetermined criteria. All Au and silver nanoparticles will act as antenna on some level, as they have large absorption cross-sections due to their plasmonic properties. However, nanoparticles including sharp corners, edges, and gaps between particles are preferred as these function best as nanoantennas. Other plasmonic materials can also be used. Cu is an example material, but is less efficient and oxidizes more readily than Ag/Au. Al is another option. Al is plasmonically active in the UV instead of visible. Similarly, Pt/Pd is plasmonically active in the deep UV.

Experiments have demonstrated manufacture of probes with silver nanocubes, which form a preferred embodiment that provides the best optical performance that has been demonstrated to date with the preferred methods of the invention. Simulations have demonstrated that gold bipyramid nanoparticles will support the nanoantenna function and be better suited for particular applications, such as non-gap mode methods. Gold bipyramid nanoparticles are known in the art. A method for fabrication can be found in Liu & Guyot-Siionnest, "Mechanism of silver(I)-assisted growth of gold nanorods and bipyramids," *J. Phys. Chem. B*. 109. 22192 (2005). The gold bipyramid nanoparticles can be formed into a monolayer and applied as a film via the same method as the silver nano cubes. Our simulations suggest that bipyramids and their sharp tapered points will focus light phenomenally. This nanoantenna scanning probe of the invention with gold bipyramids is supported by simulation data to produce enormous signals even without a metal substrate, non-gap mode operation. Gold has other advantages, such as resistance to oxidation. Therefore, a protective coating is less important and with the nanoantenna scanning probe with gold pyramid nanoparticles can be stored without protections against oxidation. The surface chemistry for the Langmuir-Blodgett film of the gold nanoparticles is different. Excess surfactant during synthesis/purification steps should be avoided. Surface chemistry such as alkanethiols (hydrophobic) can be used to intentionally aggregate the nanoparticles in aqueous solution, which allows washing the excess surfactant out, and then redispersing the particles in organic solvent (chloroform). Another publication has demonstrated the feasibility of these monolayers using a thiolated-polystyrene, which represents another option. Shi, Q, et al., "Two-Dimensional Bipyramid Plasmonic Nanoparticle Liquid Crystalline Superstructure with Four Distinct Orientational Packing Orders," *ACS Nano*, 2016, 10(1) 967-976. The polymer on the nanocubes from this synthesis works perfectly to form uniform monolayers, whereas the surfactant on the nanobipyramids from synthesis must be replaced via chemistry.

Preferred embodiments provide for batch manufacturing of engineered plasmonic probes of the invention. Many of the existing fabrication techniques have single-tip throughput. Example experiments have demonstrated 15 simultaneously fabricated tips, made in 3-5 hours, with a greater than 80% yield. Fabricating 50 or 100 tips would add little to no extra time to the process, based upon the experiments. Experiments have shown that the shaped nanomaterials and tunability provide probes that achieve enhancement factors commonly in the range of $10^8$-$10^9$ at a wavelength of 785 nm, and $10^6$-$10^7$ at 633 nm. This compares favorably to most etched metal or evaporation coated tips, which are generally have a maximum enhancement factor in the $10^6$-$10^7$ range, while also providing for batch manufacturing.

A preferred vertical dip coating method controls the AFM apex to first penetrate the compressed monolayer film of nanoparticles. An experiment has shown this process to achieve near a 100% yield, demonstrated experimentally as 15/15 tips.

A particular preferred embodiment nanoantenna scanning probe assembled with silver nanocubes has demonstrated robust response at 785 nm. Because of the plasmon delocalization, the enhancement is robust at this wavelength irrespective of nanocube orientation or arrangement. The unique geometry of the contiguous film allows this robust broadband response.

A preferred fabrication method uses the Langmuir-Blodgett method to self-assemble colloidally grown nanoparticles onto a sharp probe tip. Nanoparticles are trapped at a water surface, using surface tension. The 2-dimensional limitation of nanoparticle movement allows the nanoparticles to be slowly compressed into a highly uniform and organized monolayer. Film portions can then be transferred to one or more sharp probe tips using a mechanical dip coater.

Preferred methods trap nanoparticles at the air-water interface in a water-immiscible and volatile solvent, such as chloroform. This spreads the colloidal solution on the surface and then the solvent will quickly evaporate, leaving only the nanoparticles. Steric repulsion forces the nanoparticles to spread out evenly, at which point movable barriers can compress the surface and pack the nanoparticles tightly together into an ordered lattice. A sharp probe tip is then pulled through the film and it is transferred from the water surface to the probe In preferred methods, sharp probe tips are blunted to improve adhesion of a film to the tip. The blunting is preferably accomplished via a plasma-enhanced chemical vapor deposition (PECVD) process to grow a thin semiconductor or oxide layer on the sharp probe tip, resulting in a larger radius of curvature. A preferred embodiment uses a commercial silicon AFM tip and increases the radius of curvature by forming a silicon dioxide layer on the tip. Other oxides and nitrides can be used to blunt the tip, for example, aluminum oxide, titanium oxide, and silicon nitride. For STM tips and tuning fork tips, other blunting processes can be used. Conventional oxide and nitride formation processes can be used. After the nanoparticle film is on the sharp probe tip, various chemical processes can be performed to coat and protect the nanoparticle surface from oxidation or contamination. Preferred methods protect the nano particles with alkanethiols of various chain length because they form high quality self-assembled monolayers (SAMs). These SAMs are useful for improving the shelf-life of the nanoparticles and for providing predictable Raman backgrounds that minimally interfere with data collection. In preferred methods, the nanoparticles are commercial nanoparticles, and other methods include fabricating the nanoparticles with known etching or other processes.

Preferred embodiments of the invention will now be discussed with respect to the drawings and with respect to experiments that have been conducted to demonstrate the invention. The drawings may include schematic representations, which will be understood by artisans in view of the general knowledge in the art and the description that follows. Features may be exaggerated in the drawings for emphasis, and features may not be to scale. Artisans will understand broader aspects of the invention from the experiments and experimental data.

FIGS. 1A-1D illustrate a preferred embodiment method that was conducted experimentally to fabricate nanoantenna scanning probe with plasmonic colloidal nanoparticles. In FIG. 1A a sharp probe tip 10 (silicon AFM tip in experiments) is coated with a layer of dielectric 12, which was $SiO_2$ 12 via PECVD in the experiments, to increase the radius. It is then coated with a film 14 of contiguous silver nanoparticles 16, which can be in the form of nanocubes (AgNC) gold bipyramids or other nanoparticles. FIG. 1B represents the coating process in which a Langmuir-Blodgett film 18 of silver nanoparticles 16 on liquid 20 (water, for example) is compressed to a monolayer and then transferred via mechanical dip coating to one or more AFM probe tips. Simulations have also demonstrated that gold bipyramid nanoparticles (AuNP) will act as high performance nanoantenna. FIG. 1C shows an SEM image at high magnification (scale bar 200 nm) of a colloidal nanoantenna showing a uniform layer of silver nanocubes coating the surface. FIG. 1D shows the experimental fabrication step in which multiple AFM tips simultaneously coated with a monolayer of silver nanocubes.

Figure 1F:
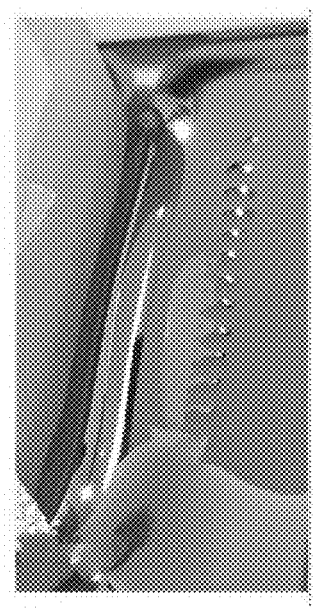
Figure 1H:
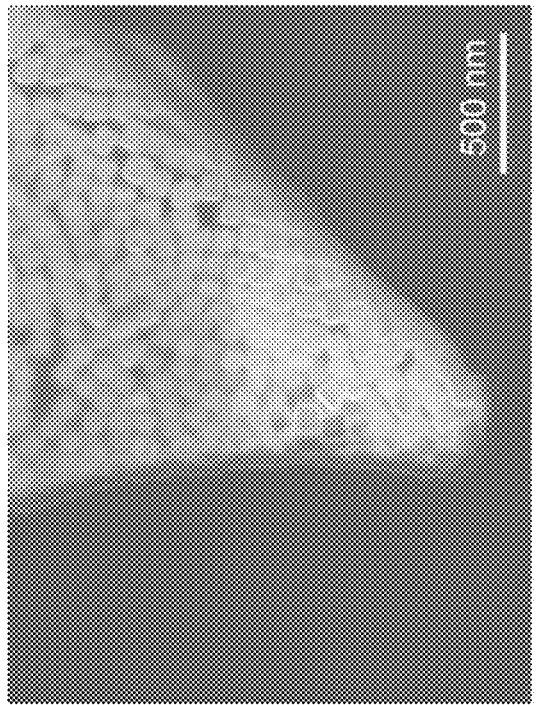
FIGS. 1G and 1H compare nanoantenna scanning probe tips formed experimentally by a preferred embodiment and modified (apex first) embodiment.
Figure 1G:

FIGS. 1E and 1F illustrate a modified preferred embodiment that is even more efficient in applying a film of nanoparticles and has been demonstrated experimentally. The AFM tip 10 is brought into contact with the compressed Langmuir-Blodgett film 18 of silver nanoparticles 16 in a direction such that an apex 10a of the AFM tip 10 first comes into contact with the film 18. FIG. 1F is an image of the experiment in which 15 AFM tips were brought into contact with the film 18 apex first. FIGS. 1G and 1H compare results for the FIGS. 1A-1D (horizontal dip) with the FIGS. 1E and 1F modified apex first (vertical dip) method. While both provided excellent coverage of nanoantenna, the apex first method of FIG. 1H provides near 100% coverage at the apex of the tip with none of the underlying AFM tip being exposed. The tip mount used in the experiments of FIGS. 1E and 1F was a Fluoropolymer 70° dipper angle dipper. The tip mount used in the FIGS. 1A-1D experiments was a glass microscope slide. The mechanical dipper was a component of a commercial KSV Nima Langmuir-Blodgett trough.

FIGS. 1I-1L illustrate the process used in the experiments to form the compressed nanoparticle films. In FIG. 1I, a substrate which acts as a tip mount for nanoantenna 30 is lowered into a Teflon® trough containing water 32. Nanoparticles dispersed in chloroform are applied to the water surface, which forms dispersed nanoparticles 34 in FIG. 1J. Barriers 36 of Delrin® are then brought together in FIG. 1K, which produces a compressed film 38. FIG. 1L shows images of the compressed nanoparticle film at different magnification.

In preferred experiments, the silver nanocubes were formed as follows. $AgNO_3$ is heated and reduced in 1-5 pentanediol. $CuCl_2$ and Polyvinylpyrrolidone (MW=55000) are added to control nucleation and growth process—and to surface passivate the nanocubes after growth. The nanocubes are then vacuum-filtered (Millipore Durapore membranes with 650 nm, 450 nm, then 220 nm pore sizes) to reduce the size dispersity of the particles by selectively removing larger, noncubic particles. AgNCs are repeatedly centrifuged in ethanol to remove excess polymer and finally suspended in $CHCl_3$.

FIGS. 2A-2E illustrate preferred fabrication methods using different radius of curvature AFM tips. Preferred methods can include modifying the radius of curvature of an AFM probe before AgNC deposition. FIG. 2A is an SEM image of an unmodified AFM probe after a monolayer of AgNCs was deposited. FIG. 2A shows that a probe tip that is excessively sharp may not allow a monolayer to transfer successfully. FIG. 2B is a SEM image showing between an unmodified (false overlay) AFM probe and an AFM probe blunted via a preferred method with a PECVD $SiO_2$ layer resulting in a 125 nm curvature. This radius of curvature can be selected as shown in FIGS. 2C-2E, which are SEM images of AgNC monolayers deposited on PECVD $SiO_2$ modified AFM probes with 65 nm radius of curvature (FIG. 2C), 90 nm radius of curvature (FIG. 2D), and 125 nm radius of curvature (FIG. 2E). The radius of curvature is controlled by the thickness of the $SiO_2$. These figures show that the radius of curvature (ROC) of the AFM tip plays an important role in the quality of the AgNC assembly on our colloidal nanoantenna. In particular, the radius should be comparable to AgNC size in order to ensure that multiple AgNCs are seated at the AFM tip apex (for mechanical stability), but that only one protrudes further than the others (for maximum field confinement). In the experiments, the best results were obtained with a tip radius of ~125 nm and the nanocubes had a minimum size of ~60 nm. For nanocubes of a minimum size of ~60 nm, the minimum tip radius of curvature is 65 nm, as such sized nanocubes will not deposit on a tip of curvature <10 nm, which is a minimum ~1:1 nanoparticle to radius of curvature size. Thus, the preferred ratio is ~1:1 nanoparticle to radius of curvature size, e.g. a preferred range of the radius of curvature is 90-130 nm for nanoparticles of 60-100 nm. In the example experiments with 60 nm nanocubes, the ~125 nm radius was found to be optimal. This radius allowed use of larger nanocubes as well, and the yield of functional tips is higher. This radius also permitted nanocube samples of inferior quality to have a higher probability of successfully coating a blunted tip. For extremely sharp AFM tips with a radius of curvature <10 nm, AgNCs do not deposit at the apex because the sharp tips destructively pierce the AgNC monolayer during the dip-coating process, as shown in FIG. 1A. Therefore, when the starting AFM tip is very sharp, the AFM probe tips are blunted by increasing the radius of curvature with a thin layer of $SiO_2$ that is deposited via plasma-enhanced chemical vapor deposition (PECVD) to produce a tip with a controlled radius of curvature. Nanocubes or nanoparticles of smaller size than ~60 nm are expected to deposit on tips with a radius of curvature <10 nm. Also, the shape of the nanoparticle will influence the relationship between nanoparticle size and radius. For example, a nanocube of 55 nm will not sit on a 10 nm tip, but a bipyramid with dimensions of 50 nm×15 nm is expected to attach to a 10 nm tip.

Tip enhanced Raman spectroscopy (TERS) was conducted with preferred embodiment scanning probe tips of the invention. FIG. 3A shows that colloidal nanoantenna on an AFM were operated in the experiments in the contact mode on a substrate and interrogated via a focused laser beam. As mentioned above, other modes can also be used, such as non-contact mode, depending upon the particular STM, AFM and Raman system, etc. The substrate investigated in an experiment is a SAM (a self-assembled monolayer) of thiophenol (PhSH) on an Ag surface. The experimental nanoantannas scanning probes were protected by a SAM of 1-hexadecanethiol (HDT), which protects the surface of the AgNCs deposited on the AFM probes from oxidation and contamination. FIGS. 3B-3D show Raman spectra with the scanning probe engaged (FIG. 3B) to a PhSH SAM on an Ag thin-film ($I_{eng}$); Raman spectra with the scanning probe removed (FIG. 3C) from the PhSH monolayer substrate by 100 nm ($I_{dis}$); and Raman specta with $I_{eng}$-$I_{dis}$ (FIG. 3D). Spectra were taken with the beam at 785 nm, 1.5 mW, and 10 s integration time. The distance between the scanning probe and the Ag thin-film was controlled by a piezoelectric stage; when the scanning probe is brought in contact with the Ag film, the supported SAM serves as a dielectric gap between the AgNC located at the scanning probe apex and the underlying metal film. This nanoscale gap supports a highly confined optical resonance that leads to a large enhancement of Raman scattering intensities. FIG. 3B shows a typical Raman spectrum obtained by measuring scattering off of the colloidal nanoantenna scanning probe. When the scanning probe is engaged to the Ag surface, we observe Raman scattering peak intensities ($I_{eng}$) that correspond to the vibrational modes for Si, HDT, and PhSH. When the scanning probe is disengaged from the surface by approximately 100 nm, we observe Raman scattering peak intensities (Ls) corresponding only to Si and HDT (FIG. 3C). FIG. 3D shows the Raman spectrum obtained by subtracting $I_{eng}$-$I_{dis}$, which shows Raman peaks for only PhSH. Most notable are the 999 cm$^{-1}$ out-of-plane ring stretch, $v(C-C)_{Ring}$, and the 1574 cm$^{-1}$ symmetric C-C stretch, $v(C-C)_S$, which exhibit little overlap with the vibrational modes for Si and HDT.

FIGS. 4A-4D are data showing TERS near-field effect as a function of tip-sample distance. AFM feedback voltage is plotted as a function of effective distance from the Ag surface. The scanning probe engages the surface at an effective distance of 0 nm (arrow), verified by a drop in feedback voltage indicating "snap-in". (B) Intensity of PhSH peaks as a function of effective distance from the Ag surface. (C-D) Intensity of HDT and Si Raman peaks as a function of effective distance from the Ag surface indicating that only the PhSH signal increases with proximity to TERS probe. Measurements taken using a 633 nm laser line at 400 µW and with a 5 s integration time.

The FIGS. 4A-4D data were obtained to examine the near-field nature of the Raman enhancement provided by scanning tips of the invention with nano antennae. The intensities ($I_{eng}$) of these peaks as the analyte substrate was moved toward the scanning probe stepwise in 2 nm increments was obtained. The AFM feedback voltage—which depends on the deflection of the cantilever—was used to verify the location of the scanning probe relative to the Ag film (FIG. 4A). A slope of zero indicates that the scanning probe is disengaged (i.e., substrate movement yields no cantilever deflection). As the substrate approaches the scanning probe, the snap-in force pulls the scanning probe into contact with the substrate, and shows as a discontinuity in the AFM feedback voltage. Further movement of the substrate will deflect the cantilever and change the feedback voltage linearly with distance. We define effective distance ($d_{eff}$) as the distance the Ag film has traveled in either direction from the measured snap-in position. A positive $d_{eff}$ is the distance separating the scanning probe and the Ag film, whereas a negative $d_{eff}$ is generated by movement of the Ag film that applies an additional force to the cantilever.

From the plots in FIG. 4B-D, we define three regimes of $I_{eng}$: substrate approach, scanning probe engagement, and deflection of the cantilever by the substrate. The intensities of the Si and HDT peaks remain constant at 538±17 and 180±20 counts/mW s, respectively, since the laser remains focused on the scanning probe apex. However, peak intensities associated with PhSH change drastically. For $d_{eff}$=2-20 nm, the peak intensities for $v(C-C)_S$ and $v(C-C)_{ring}$ remain constant at 6±7 and 7±12 counts/mW·s, respectively. These intensities increase just prior to the snap-in of the scanning probe and engagement with the substrate at $d_{eff}$=2 nm, which is consistent with reported TERS simulations [See, e.g., Notingher, I.; Elfick, A. Effect of Sample and Substrate Electric Properties on the Electric Field Enhancement at the Apex of SPM Nanotips. *J. Phys. Chem. B* 2005, 109, 15699-15706; Yang, Z.; Aizpurua, J.; Xu, H., Electromagnetic Field Enhancement in TERS Configurations. *J. Raman Spectrosc.* 2009, 40, 1343-1348] and experiments [See, Pettinger, B.; Domke, K. F.; Zhang, D.; Picardi, G.; Schuster, R. Tip-Enhanced Raman Scattering: Influence of the Tip-Surface Geometry on Optical Resonance and Enhancement. *Surf. Sci.* 2009, 603, 1335-1341; Neacsu, C. C.; Dreyer, J.; Behr, N.; Raschke, M. B. Scanning-Probe Raman Spectroscopy with Single-Molecule Sensitivity. *Phys. Rev. B* 2006, 73, 193406]. From $d_{eff}$=-4-26 nm, the peak intensities of $v(C-C)_S$ and $v(C-C)_{ring}$ have values of 423±108 and 358±50 counts/mW·s, respectively.

As the scanning probe is deflected by the substrate beyond $d_{eff}$=-15 nm, the average Raman intensity increases for both vibrational modes of PhSH. Because this increase has been observed for multiple scanning probes, we conclude that it is not an artifact of our probe fabrication. Instead, this intensity increase can be attributed to one or more of a number of effects related to an increased deflection of the cantilever. These effects can include: (i) conformational changes of the PhSH molecules within the SAM, (ii) changes in the optical near-field distribution due to bending of the cantilever, or (iii) changes in the optical near-field due to nanoscopic deformation or movement of the AgNC located at the apex with increased pressure from the substrate. We can rule out the first effect since the pressure applied at the AgNC-substrate interface is likely too low to induce any significant conformational change of the PhSH molecules. We estimate that the maximum pressure applied at the scanning probe apex would be 1.0 GPa for $d_{eff}$=-60 nm, a distance that is generously larger than the $d_{eff}$ we employed for most of our experiments. Previous studies have reported that the wavenumber for the vibrational modes of PhSH will blue-shift linearly with pressure by a few tens of wavenumbers. However, we observed no shift in wavenumber for any observable Raman scattering peak. To rule out contributions from cantilever bending, we estimate that the scanning probe apex rotates by approximately 0.02° during deflection. Simulations indicate that this rotation is unlikely to result in any measurable effect on Raman enhancement. The third effect is the most likely cause of the observed change in $I_{eng}$. Applying strain has been observed to alter the near-field distributions associated with plasmonic Ag nanostructures. See, Qian, X.; Park, H. S., Strain Effects on the SERS Enhancements for Spherical Silver Nanoparticles. *Nanotechnology* 2010, 21, 365704. Applied pressure may also cause minor slipping of the metal nanoparticles on the oxide-coated scanning probe.

The silver nanocube nanoantennae scanning probes demonstrated Raman enhancement factors (EFs) ranging from $10^5$-$10^9$ depending on the excitation wavelength. FIG. 5A includes TERS spectra collected at different laser excitation wavelengths for the scanning probes with colloidal nanoantenna shown in FIGS. 5B and 5C (514 nm is multiplied 25× to identify the 1574 cm$^{-1}$ I$_{stretch}$ peak), which are SEM images of a scanning probe with the apex AgNC false colored for visual clarity (scale bars 200 nm) FIGS. 5D-5F illustrate the field enhancement in the plane between the apex AgNC, determined from a simulation based on the orientation of the apex AgNC shown in FIGS. 5B and C (scale bars 25 nm). Measurements taken for 785, 633, and 514 nm excitation were taking with respective power and time: 800 µW & 10 s, 80 µW & 10 s, 60 µW & 10 s. The laser spot size for the 785 nm is significantly larger than the other excitation wavelengths, demonstrating a benefit of using of a higher power excitation laser.

The Raman spectra of FIG. 5A were taken with the scanning probe shown in the SEM images in FIG. 5B, C using three different laser excitation wavelengths: 785, 633, and 514 nm. We obtained the highest I$_{eng}$ with an EF= (5.5±2.0)×10$^8$ using the 785 nm laser line. The other two laser lines gave EF=(1.3±0.4)×10$^7$ for 633 nm and EF=9.7× 10$^5$ for 514 nm. Similar experiments were repeated for 16 different scanning probes under 633 nm excitation and 20 different scanning probes under 785 nm excitation. Raman scattering obtained from 514 nm excitation was very weak and was only detected for the single scanning probe discussed in FIG. 5A. Our results demonstrate that the average EF for our scanning probes is in the range of 10$^8$-10$^9$ using the 785 nm laser line and in the range of 10$^6$-10$^7$ for the 633 nm laser line. In a separate experiment, we fabricated 10 nanoantenna scanning probes in parallel and evaluated the EF of each nanoantenna scanning probe under 785 nm excitation. Eight out of the 10 scanning probes resulted in an EF between 1.0×10$^8$-2.8×10$^9$, while two scanning probes were only weakly Raman active or completely inactive. In addition, we compared batch reproducibility using a single AgNC sample. We fabricated 36 TERS probes in five separate batches. Of these nanoantenna scanning probes, 28 (78%) were TERS active and 23 exhibited suitable EFs to acquire chemical maps. Based on the experiments and simulations, preferred lasers have a wavelength of ~700 nm to ~850 nm for the experimental AFM based nanoantenna scanning probe tips. Additional preferred embodiments can use a wavelength of up to 1064 nm. The nanoparticle type and size and the type of substrate can shift the resonance curve. It is expected that a 488 nm or 514 nm would be ideal in a high performance system that operates in a non-gap mode (without metal substrate).

FIGS. 6A and 6B respectively show simulated data of the Field enhancement resulting from the apex AgNC solved at the excitation wavelength of 785 nm and 856 nm, for the 999 cm$^{-1}$ Raman shifted wavelength. FIG. 6C shows calculated EF (enhancement factor), where the dashed white line shows the hotspot area from which the average EF is calculated. FIG. 6D plots EF determined over the visible spectrum: shaded area is the simulated Raman enhancement region, the lower bound is the simulated electromagnetic (EM) and the upper bound is the simulated EM+chemical EF, circles are the experimentally determined EF.

We calculated the expected Raman EF for our colloidal nanoantenna over a wavelength range of 400-1000 nm, which is expected to reach a maximum at 733 nm. To determine the EF at a given wavelength, we first calculated the EF for each pixel in the near-field distribution map using the equation below:

$$EF = \left(\frac{E_{Incident}}{E_0}\right)^2 \left(\frac{E_{Raman\ Shift}}{E_0}\right)^2 \quad 1)$$

For the FIG. 6 data, the EF was calculated for the 999 cm$^{-1}$ vibrational mode of PhSH. The near-field distribution maps for the incident wavelength and the Raman-shifted wavelength for the 999 cm$^{-1}$ mode are shown in FIGS. 6A and 6B, and similar near-field maps were obtained over the entire wavelength range of interest. FIG. 6C shows the spatial dependence of the calculated EF for 785 nm excitation, as determined from the E/E$_0$ values in FIGS. 6A and 6B. For visual clarity, the calculated EF is only shown within the hotspot area, which we defined as the region from which 90% of the Raman signal originates and is considered a conservative estimate of the EF. For example, we determined the hotspot area to be 598 m$^2$ for 514 nm excitation, 249 nm$^2$ for 633 nm excitation, and 302 nm$^2$ for 785 nm excitation. We then determined the average EF—the metric most representative of the experimental data—by dividing the sum of all EF values within the hotspot by the total hotspot area. The average EF value was calculated at each wavelength over the visible spectrum. The results are plotted in FIG. 6D (black line) against our experimentally calculated EFs (black circles). The discrepancy between our experimental and theoretical EF values is attributed to a deficiency in our FDTD models, which only accounts for electromagnetic enhancement of Raman scattering. It is well-known that Raman scattering intensities also experience a chemical enhancement, which can arise from molecular resonances or an increase in polarizability due to surface adsorption. For PhSH monolayers that are chemisorbed to Ag surfaces, a chemical EF≈11 is expected. Taking into account both the chemical and electromagnetic EFs increases the overall EF and reduces the discrepancy between our measured and predicted values (FIG. 6D, dotted line). A waveguiding mode could also contribute to an unexpectedly high EF in the event that our 5 AgNC model did not sufficiently account for accurate locations and orientations. Alternatively, it is possible that other inaccuracies in our FDTD model—with the tip-to-substrate gap distance, measured AgNC size, or the bulk Ag dielectric function—may contribute to this discrepancy.

Figure 7:
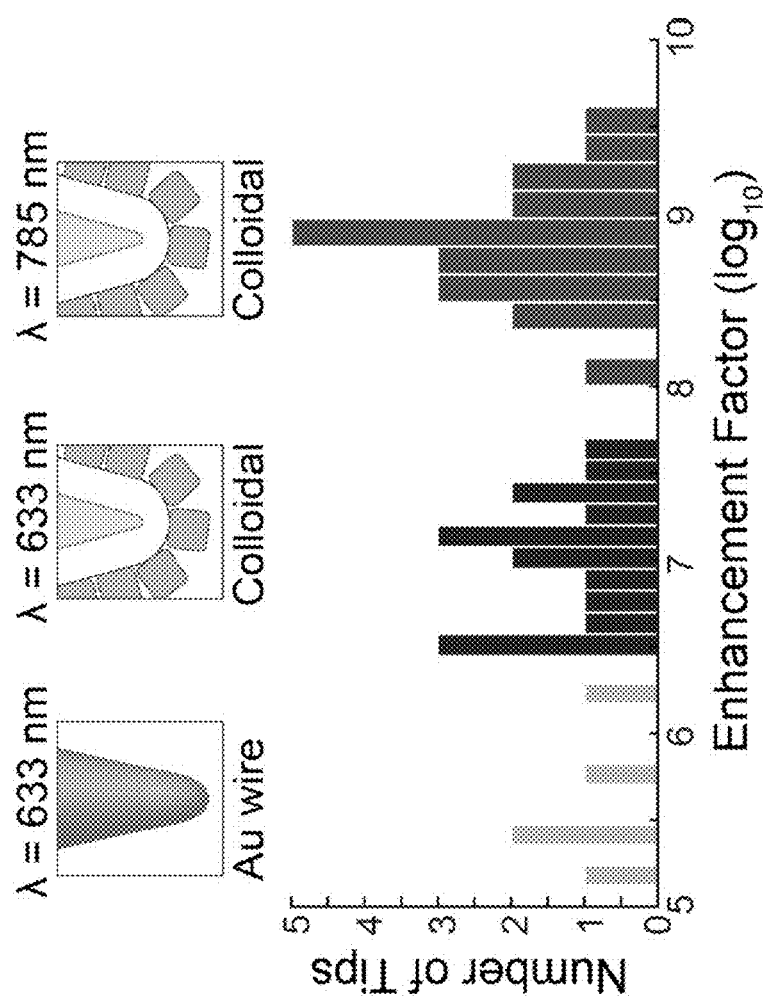
FIG. 7 compares experimental nanoantenna scanning probes to an Au nanowire TERS probe.

FIG. 7 compares an experimental scanning probe to an Au nanowire TERS probe. Histogram showing the logarithmic values of EFs for colloidal nanoantenna excited at 785 nm, and 633 nm. A direct comparison with an identical substrate and identical 633 nm illumination conditions was performed with a commercial etched Au wire TERS probe. The commercially available electrochemically etched Au wires were operated in tuning fork feedback mode. The logarithmic values of the EFs are displayed for our colloidal nanoantenna at both 633 and 785 nm excitation and for the purchased etched Au wire probes at 633 nm excitation. All measurements were made on identically fabricated PhSH monolayers on Ag substrates. We measured the TERS performance of 10 etched Au wire probes and found that only five gave measurable TERS signals. We calculated the average EF of these five probes to be (6.3±7.4)×10$^5$. The large error in EF likely stems from nanoscale morphological differences at the wire apicies, a common problem with etched wire probes. We then measured the TERS performance of 16 colloidal nanoantenna scanning probes and calculated their EFs to be (1.4±1.3)×10$^7$. Not only do our colloidal nanoantenna scanning probes achieve EFs that are over 20 times higher than the commercial probes for 633 nm excitation and 1-2 orders of magnitude better for 785 nm excitation, but they also exhibit much lower deviations in EF with 78% of the colloidal nanoantenna scanning probes resulting in measurable TERS enhancements. We attribute the consistency in EF among our colloidal nanoantenna scanning probes to the broadband response of the gap plasmon mode, which is tolerant of variance in AgNC orientation and AgNC shape.

Figure 8B:
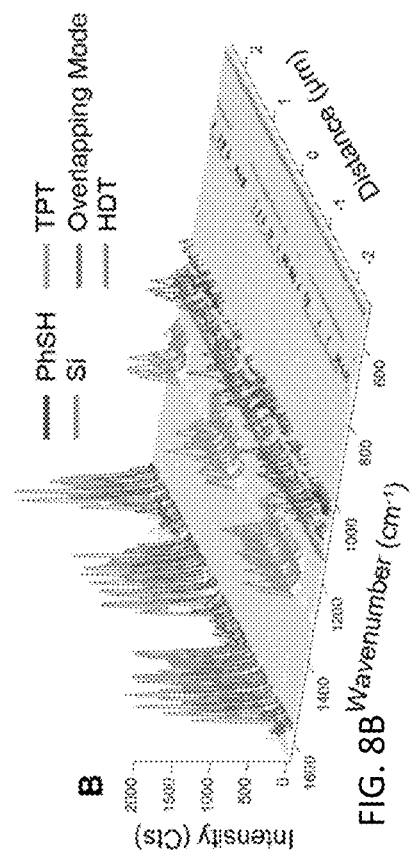
FIGS. 8A-8F are data obtained from colloidal nanoantenna scanning probes used to map a chemical surface by TERS.
Figure 8A:
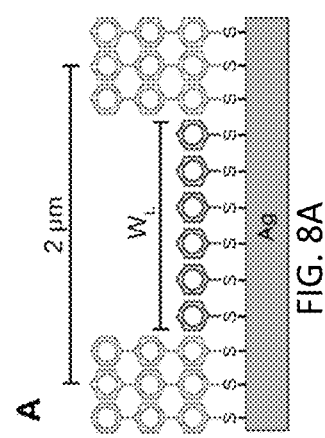
Figure 8D:
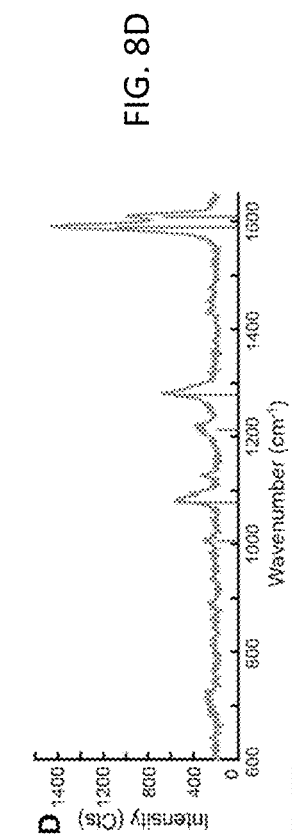
Figure 8C:
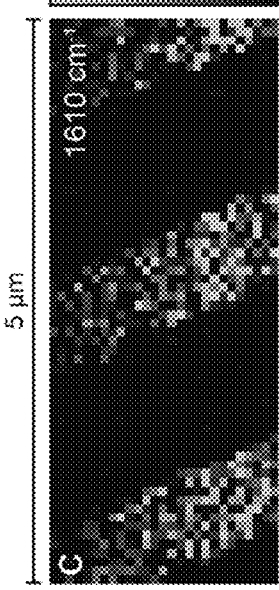
Figure 8F:
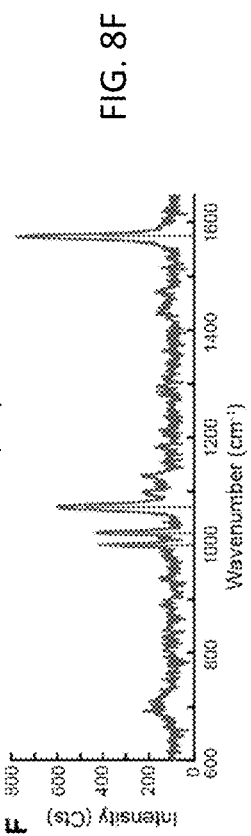
Figure 8E:

FIGS. 8A-FIG. 8F include data demonstrating chemical mapping and spatial resolution abilities of the experimental nanoantenna scanning probes. FIG. 8A is a schematic diagram of a patterned Ag thin-film with 1,1':4',1''-terphenyl-4-thiol (TPT) (molecules on ends), and PhSH (backfilled molecule in center), the pitch is 2 µm, and the width of individual lines varies between substrates. FIG. 8B is data of a hyperspectral linescan across the stripped pattern. The stripe pattern can clearly be identified with a 39 nm step size. FIG. 8C shows TERS map and FIG. 8D representative spectra of the stamped molecule on the Ag substrate. The map is 5×2.5 µm, and has a pixel size of 78 nm×78 nm. FIG. 8E shows a TERS map and FIG. 8F representative spectra of the backfilled molecule (PhSH). Spectra for FIG. 8B were collected with an excitation wavelength of 785 nm, at a power of 1.5 mW, and a 0.3 s integration time, while FIGS. 8 C-F data were collected with a 1 s integration time.

FIG. 8 data was collected with colloidal nanoantenna scanning probes used to map a chemical surface by TERS. We patterned an Ag substrate with two different molecular monolayers—TPT, and PhSH—using soft contact lithography. SEM images verified that the stripe pattern was successfully transferred to the Ag surface. Confocal Raman maps taken of the patterned substrate provided no evidence of the chemical patterns and exhibit Raman scattering intensities that are too low to distinguish either molecular component of the heterogeneous pattern. When we collect TERS spectra perpendicularly to the patterned substrate however, a clear variation in chemical spectra was revealed (FIG. 8B). The FIG. 8B data include clear, separate spectral peaks representing TPT and PhSH, and others attributed to the HDT SAM on the AgNC surface and the Si probe respectively. Spectra were taken with a linear step of 39 nm and well below the Abbe diffraction limit of 280 nm (for a 785 nm light source). At some stripe edges, two mutually exclusive spectra are observed, indicating that the resolution of the TERS probe is at least as good as the step size. Other stripe edges display a mixture of the spectra suggesting a diffusion region where the two components have mixed. While we expect the nanoantenna scanning probes to produce spatial resolution significantly less than shown here, patterned molecular monolayers are not likely able to identify spatial resolution below the 39 nm step size presented here as it would become convoluted with the diffusion region.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A method for fabricating a nanoantenna scanning probe, comprising:
   placing a sharp probe tip in liquid under a liquid surface; trapping nanoparticles having a predetermined size and shape on the liquid surface using surface tension;
   forming a uniform and organized monolayer film on the liquid surface; and
   transferring portions of the organized monolayer film to the sharp probe tip to coat the sharp probe tip with a monolayer of the nanoparticles by moving the sharp prove tip through the organized monolayer film on the liquid surface.

2. The method of claim 1, wherein the sharp probe tip comprises a conductive STM (scanning tunneling microscopy) tip.

3. The method of claim 1, wherein the sharp probe tip comprises a tuning fork tip.

4. The method of claim 1, wherein the sharp probe tip comprises an AFM (atomic force microscopy) tip.

5. The method of claim 1, wherein the sharp probe tip comprises a blunted tip.

6. The method of claim 5, wherein the sharp probe tip blunted with an oxide or nitride layer.

7. The method of claim 6, wherein sharp probe tip comprises a blunted AFM tip.

8. The method of claim 6, comprising a step of plasma enhanced chemical vapor deposition to form the oxide layer.

9. The method of claim 8, wherein the oxide blunts the tip to a radius of curvature such that the size of the nanoparticles to the radius of curvature is ~1:1.

10. The method of claim 1, comprising transferring portions of the film to a plurality of sharp probe tips.

11. The method of claim 1, wherein the nanoparticles comprise silver nanocubes.

12. The method of claim 1, wherein the nanoparticles comprise gold bipyramidal nanoparticles.

13. The method of claim 1, wherein the AFM tip comprises silicon blunted with a silicon dioxide coating.

14. The method of claim 1, wherein said forming comprises compressing the nanoparticle film.

15. The method of claim 14, wherein said transferring comprises bringing the sharp probe tip into contact with the nanoparticle film via a mechanical mover.

16. The method of claim 14, wherein the mechanical mover brings the apex of the sharp probe tip first into contact with the nanoparticle film.

17. A nanoantenna scanning probe tip for microscropy or spectroscopy comprising sharp probe tip covered with a contiguous monolayer film of predetermined sized and shaped plasmonic nano particles, wherein the sharp prove tip comprises a blunted AFM tip, conductive STM tip or tuning fork tip, having a radius of curvature that equals or exceeds a seize of the plasmonic nano particles.

18. The nanoantenna scanning probe tip of claim 17, wherein the AFM tip is blunted with an oxide or nitride coating.

19. The nanoantenna scanning probe tip of claim 17, further comprising a protective coating over the plasmonic nano particles.

20. The nanoantenna scanning probe tip of claim 17, wherein the nanoparticles comprise silver nanocubes.

21. The nanoantenna scanning probe tip of claim 17, wherein the nanoparticles comprise gold bipyramidal nanoparticles.

22. The nanoantenna scanning probe tip, of claim 17, wherein the sharp probe tip comprises a silicon AFM (atomic force microscopy) tip blunted with a silicon dioxide coating.

23. The nanoantenna scanning probe tip of claim 17, wherein the sharp probe tip comprises a conductive STM (scanning tunneling microscopy) tip.

24. The nanoantenna scanning probe tip of claim 17, wherein the sharp probe tip comprises a tuning fork tip.

25. A method for scanning probe spectroscopy, the method comprising:
   bringing a nanoantenna scanning probe into contact or near a surface, wherein the nanoantenna scanning probe comprises a sharp probe tip coated with a monolayer film of plasmonic nanoparticles, wherein the sharp probe tip comprises a blunted AFM tip, conductive STM tip or tuning fork tip, having a radius of curvature that equals or exceeds a size of the plasmonic nano particles;
   moving the probe relative to the surface;
   directing a radiation beam at the probe during said moving; and
   obtaining spectra from the probe during said moving.

26. The method of claim 25, wherein the nanoparticles comprise silver nanocubes.

27. The method of claim 25, wherein the nanoparticles comprise gold bipyramidal nanoparticles.

28. The method of claim 25, wherein the radiation beam comprises a 488-1064 nm laser beam.

29. The method of claim 28, wherein the radiation beam comprises a ~700 nm to ~850 nm nm laser beam.

* * * * *